United States Patent [19]

Hansen

[11] Patent Number: 5,507,945
[45] Date of Patent: Apr. 16, 1996

[54] LIQUID TREATMENT APPARATUS

[76] Inventor: Austin C. Hansen, 445 Forest Hills Dr., Atlanta, Ga. 30342

[21] Appl. No.: 377,807

[22] Filed: Jan. 24, 1995

[51] Int. Cl.$^6$ .................................................. B01D 11/02
[52] U.S. Cl. ..................... 210/198.1; 422/263; 422/277; 222/190; 137/268; 239/310
[58] Field of Search ........................ 210/198.1; 422/261, 422/263, 277; 222/190; 137/268; 239/310, 315

[56] References Cited

U.S. PATENT DOCUMENTS

| | | | |
|---|---|---|---|
| D. 350,383 | 9/1994 | Taylor et al. ............................ | D23/207 |
| 1,611,406 | 12/1926 | Bell . | |
| 1,691,359 | 11/1928 | Pulkinghorn ............................ | 4/226.1 |
| 2,370,472 | 2/1945 | King ........................................ | 252/1 |
| 2,370,473 | 2/1945 | King ........................................ | 210/23 |
| 2,536,361 | 1/1951 | Flanders .................................. | 299/84 |
| 2,989,979 | 6/1961 | Karlson .................................... | 137/268 |
| 3,043,772 | 7/1962 | Liddell .................................... | 210/57 |
| 3,432,428 | 3/1969 | Wirth, Jr. et al. ...................... | 210/29 |
| 3,901,262 | 8/1975 | Gutkowski .............................. | 137/268 |
| 4,249,562 | 2/1981 | King, Sr. ................................ | 137/268 |
| 4,584,106 | 4/1986 | Held ........................................ | 210/754 |
| 4,691,732 | 9/1987 | Johnson et al. ........................ | 137/268 |
| 4,842,729 | 6/1989 | Buchan .................................. | 210/198.1 |
| 4,873,727 | 10/1989 | Haman .................................... | 4/226 |
| 4,908,190 | 3/1990 | Maglio et al. .......................... | 422/276 |
| 5,320,288 | 6/1994 | Ketcham, Jr. .......................... | 239/316 |

OTHER PUBLICATIONS

Stern's Nurseries, Inc. Advertisement for Miracle Gro Feeder No-Clog Feeder.

*Primary Examiner*—Neil McCarthy
*Attorney, Agent, or Firm*—Fitch, Even, Tabin & Flannery

[57] ABSTRACT

An apparatus for dispensing a measured amount of a chemical into a fluid piping system comprising a cap having fluid entrance and exit ports between which is a tubular flow conduit. The tubular flow conduit has a first passageway therein to divert a portion of the fluid passing through the system into a canister attached to the cap. A container is disposed within the canister containing a solid chemical which is partially dissolved by fluid introduced into the container. A portion of the dissolved chemical passes out through a second passageway in the tubular flow conduit located downstream from the first fluid passageway and is reintroduced into the fluid system.

2 Claims, 2 Drawing Sheets

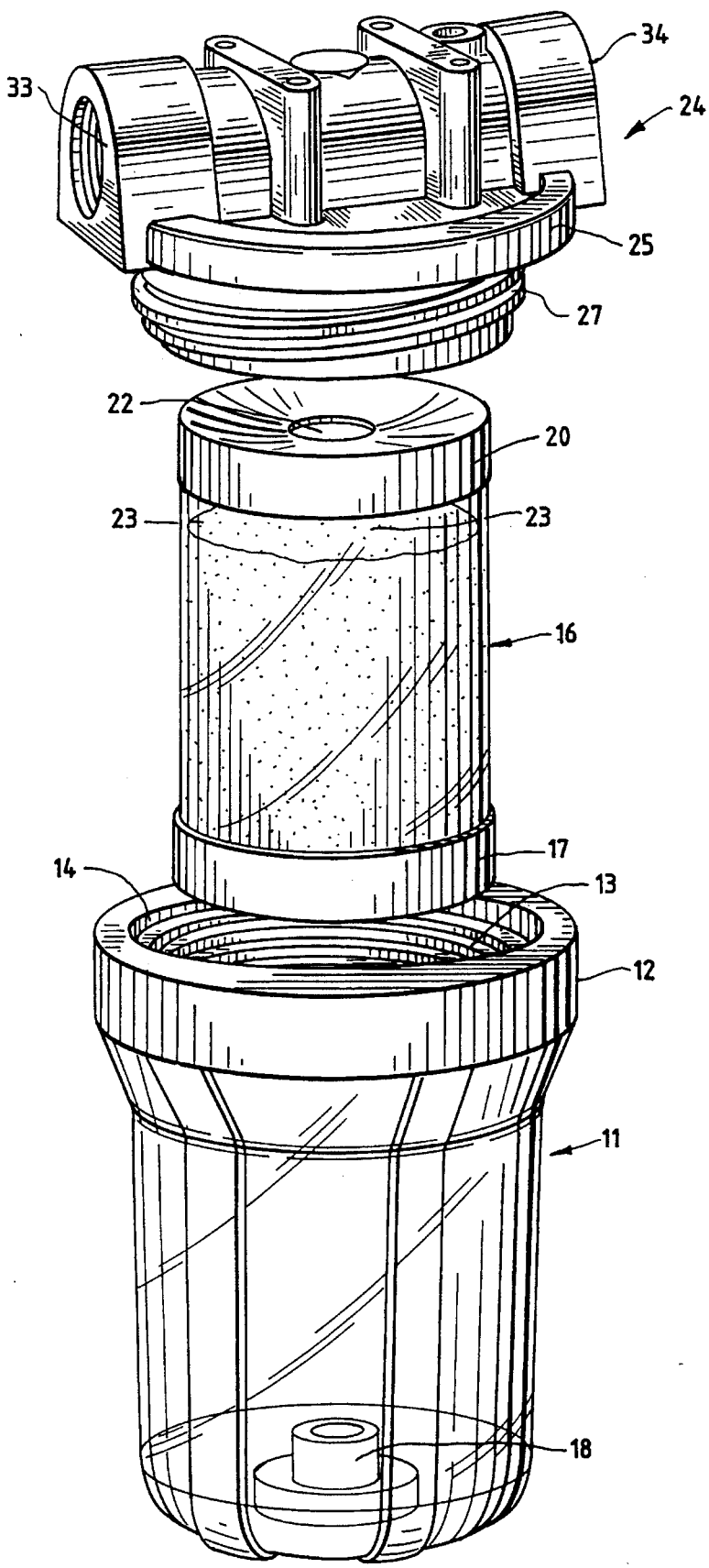

LIQUID TREATMENT APPARATUS

This invention relates to chemical treatment of liquids.

It is well known that treatment of water with chemicals can improve the treated water in various respects. Thus, a chemical treatment of water can serve to prevent metals such as iron, calcium, copper and manganese from coming out of solution and forming scale on lines and vessels. Apparatus which can be utilized to economically and effectively treat water with appropriate chemicals is thus desired in the art.

It is a principal object of this invention to provide apparatus which can be used to introduce in controlled amounts a chemical product into a water stream.

It is another object of the invention to provide apparatus for treating with chemicals which is adapted for insertion in a water flow line in such manner that chemical replenishment can be accomplished without disrupting the flow line.

It is still another object of the invention to provide apparatus which holds a water-treating chemical in such manner that the chemical can be eroded and dissolved in a water stream at a controlled rate.

The present invention involves a chemical dispenser adapted for insertion into a water flow line to disperse a chemical product into a water stream passing through the line. The chemical dispenser comprises a canister having means on the upper portion thereof for attachment to a fluid conveying cap member. A container for holding a chemical to be dispensed is adapted to fit within said canister. The chemical container has apertures therein spaced around the periphery of the upper portion and a top cover therefore having a centrally disposed opening. A cap member having a fluid flow conduit operatively attached thereto is adapted for attachment to the canister. A portion of the flow conduit is of reduced diameter and inlet and outlet attachment nozzles are provided on the distal ends of the conduit. Passage means provide communication between the fluid flow conduit and the interior of said canister and between the interior of the chemical container and the fluid flow conduit.

The novel chemical dispenser and the advantages thereof will be further apparent from the following description taken in conjunction with the drawings wherein:

FIG. 3 is a perspective view of the dispenser of the invention showing the separated components thereof in position for assembly.

Figure 1:
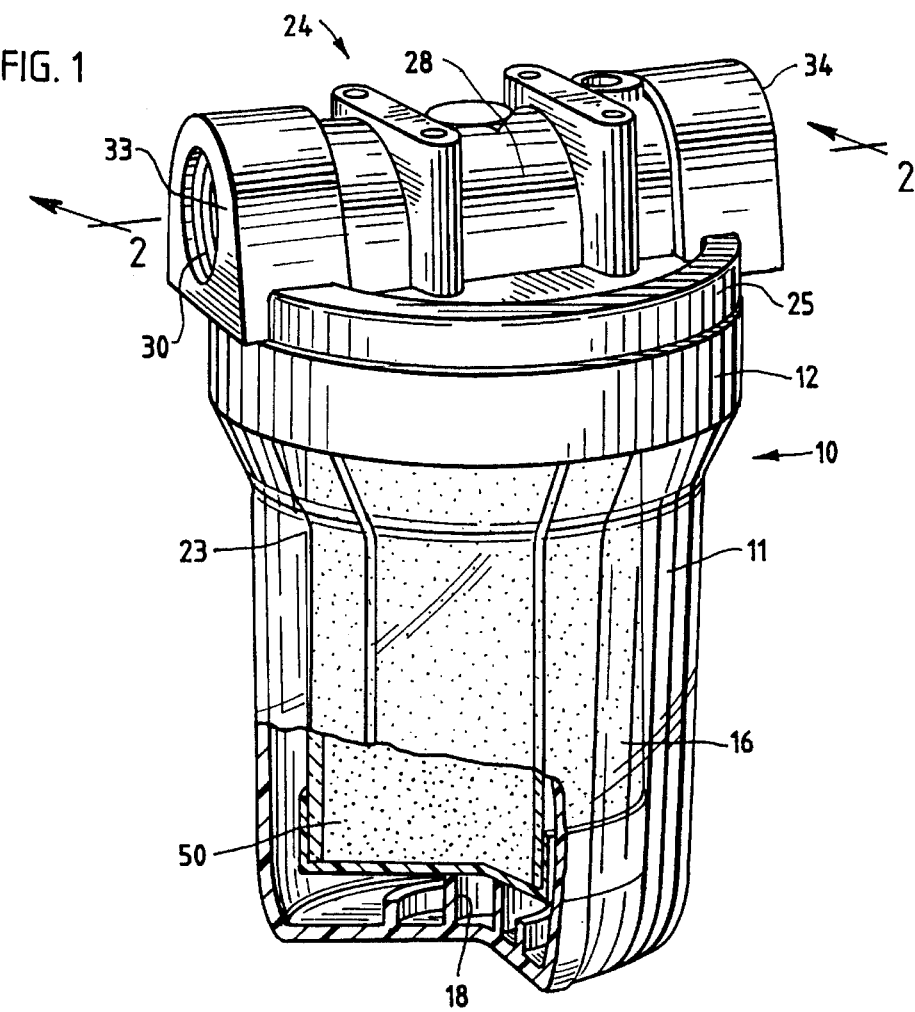
FIG. 1 is a perspective view partially broken away of the chemical dispensing apparatus of the present invention.
Figure 2:
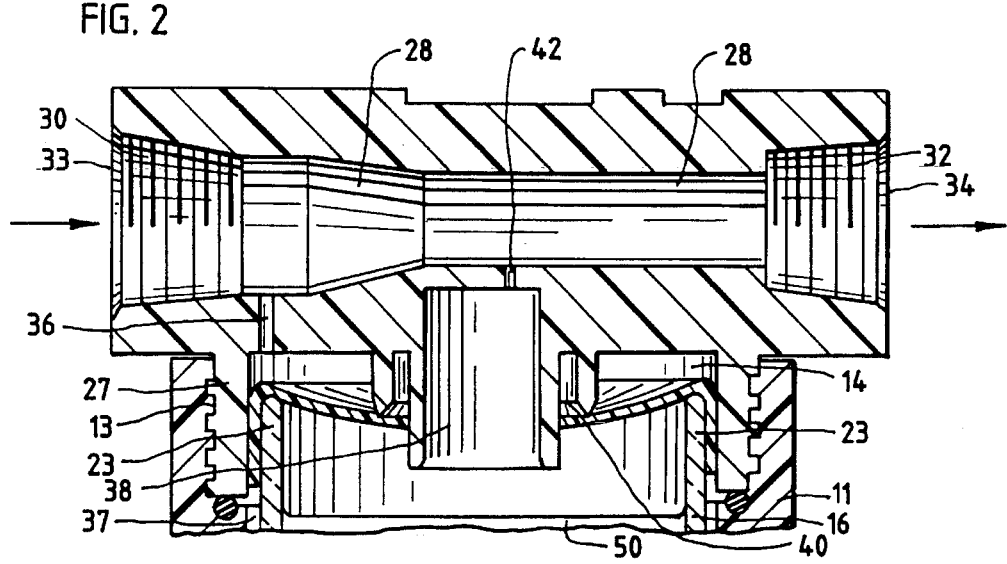
FIG. 2 is a view in cross-section taken on the line 2—2 of FIG. 1 of the cap member used in the dispensing apparatus of the present invention and the flow conduit associated therewith with the cap being attached to the canister.

Referring to the drawings, the numeral 10 refers to the assembled dispensing device of this invention. The device includes an outer canister 11 which is made from a strong, durable material, such as a clear or opaque plastic, to permit viewing of the interior. The canister is generally cylindrical and has a flared neck portion 12 which carries threads 13. Preferably an elastomeric gasket 14 is fittable within the neck 12 to assist sealing of the cap to the canister.

Adapted for insertion into canister 11 is cylindrical container 16. The bottom of container 16 is sealed such as by bottom closure 17. The dimensions of container 16 are such that it easily fits within the canister leaving a small annular space therebetween. The sealed bottom of the container 16 rests on upstanding spacer 18 which serves to permit fluid flow underneath and around container 16. The container 16 is of such height that when resting on spacer 18 its top surface is approximately planar with the top surface of canister 11. The container 16 is preferably made of a clear plastic to permit viewing of the chemical contained therein. The bottom of the container is sealed but has a removable top 20 in which a centrally located hole 22 is provided. A plurality of small apertures 23, preferably four, are spaced around the periphery of the container near the removable top 20.

Completing the chemical dispenser of the invention is a cap member 24. Cap member 24 comprises a circular base 25 with depending attaching threads 27 which mate with the threads 13 on neck 12 of canister 11 and permit the cap to be securely attached to and seal the canister. Carried on the top of cap base 25 is the tubular flow conduit 28 which has a reduced diameter along a portion of its length. Threaded attachment means 30 and 32 are respectively disposed at the inlet port 33 and outlet port 34 of the flow conduit 28. An inlet passageway 36 provides fluid communication between the interior of flow conduit 28 and the annular space 37 between inner container 16 and canister 11.

Downwardly depending from the base 25 of the cap is a hollow, generally cylindrical mating member 38 which is sized and adapted to be received in opening 22 of chemical container 16. Seal member 40 extends circumferentially around member 38 and forms a seal between it and the opening 22 of the chemical container. An outlet passageway 42 provides fluid communication between the interior of chemical container 16 and the portion of the flow conduit 28 of reduced diameter.

The chemical dispenser of this invention can be used to treat water or other liquids with a variety of chemicals known to be useful for a particular application. For example, various phosphate compounds are useful for treating water to reduce corrosion and/or scale build-up. Water treating compositions are disclosed, for example, in U.S. Pat. Nos. 2,370,472, 2,370,473, 3,043,772 and 3,432,428.

It is preferred that the chemical treating agent be utilized in caked or molded form and, of course, the chemical agent should have some degree of solubility in the liquid being treated. Thus, in the case of water-treating chemicals, a caked or molded form thereof can be prepared by removing water from a saturated or super saturated solution thereof.

Similarly, the size of the chemical dispenser and the component parts thereof can be varied depending upon the application and, more particularly, the volume of liquid to be treated.

As illustrative, for use in treating water in a ⅞ inch diameter line the components of the dispenser can have the following approximate dimensions:

| | |
|---|---|
| canister (11) overall height | 5-½ inches |
| canister internal diameter | 3 inches |
| external diameter of flared neck (12) of canister | 3-¾ inches |
| chemical container (16) overall height | 5 inches |
| chemical container (16) diameter | 2-¾ inches |
| tubular flow conduit on cap | 5 inches total length |
| reduced diameter portion of tubular flow control | length, 2-¼ inches |
| inlet passageway 36 | located 1 inch from entrance to inlet port 33 |
| outlet passageway 42 | located 2-½ inches from entrance to inlet port 33 diameter ⁷⁄₁₆ inch |

A dispenser having the above approximate dimensions can hold in cake form approximately 330 grams of chemical agent. With a water flow rate that is or can be variable up to 10 gallons per minute, approximately 35,000 gallons of water can be treated before refill of the chemical is necessary. Under these conditions, the concentration of the water treating chemical, say, for example, a soluble polyphosphate salt in the treated water, is approximately four parts per million. The concentration of the chemical can be controlled by varying the aperture dimension of outlet passageway 42.

For use, a chemical treating agent 50 in cake form is placed in container 16 and its removable top 20 attached thereto. The container 16 is then placed within canister 11 and cap 24 securely threaded onto the canister. Inlet port 33 is then attached to a line carrying a liquid to be treated, such as a water line, and likewise outlet port 34 is attached to the line. Once inserted into the fluid line, the cap can remain therein permanently and the canister 11 and container 16 can be removed from the cap for replenishment of chemical treating agent.

In operation, liquid, say water, enters inlet port 33 and flows through fluid conduit 28. The reduced diameter portion of conduit 28 creates a Venturi flow effect with the higher pressure on the inlet side causing water to flow through passageway 36 into the annular space surrounding chemical container 16. As this annular space fills with water, the water enters container 16 through the spaced apertures 23 therein and erodes and dissolves the chemical 50 contained therein. Water containing dissolved chemical is then passed upwardly through fluid passage 42 and back into flow conduit 28 from which it exits through outlet port 34.

The dispenser of this invention is particularly adapted for permanent insertion in a water line to reduce corrosion and scale formation created by impurities in the water. The dispenser can also be utilized to dispense fertilizer compositions, plant foods or to chlorinate swimming pools. While the chemical 50 held in container 16 is preferably in molded, dried or cake form, it can also be utilized in powdered or granular form.

As will be appreciated, the chemical dispenser is of simplified construction and does not involve mechanical moving parts. The components thereof can be formed from readily available, inexpensive materials. The dispenser can easily be inserted into a fluid line without the use of special tools or expertise and it automatically and accurately dispenses a desired amount of chemical into the fluid flow.

Those modifications and equivalents which fall within the spirit of the invention are to be considered a part thereof.

What is claimed is:

1. Apparatus for insertion into a liquid flow line for dispensing a soluble chemical into the liquid flowing through the flow line comprising:

a canister having a cap attachment means on the upper portion thereof;

a chemical holding container adapted to fit within said canister and having apertures therein spaced around a periphery thereof and a top cover therefor having a centrally disposed opening;

a cap member having means for removably attaching the cap to the canister;

said cap member having a base and a mating member depending from said base, said mating member adapted to be received in said centrally disposed opening, a fluid flow conduit operatively connected with the cap member having a portion thereof of reduced diameter and inlet and outlet ports on the distal ends thereof;

a first passageway positioned upstream of said reduced diameter portion of said fluid flow conduit and providing fluid communication between the fluid flow conduit and an annular space surrounding an outer surface of said chemical holding container and an interior surface of said canister; and a second passageway providing fluid communication between the interior of said container and through said mating member and into said reduced diameter portion of the fluid flow conduit.

2. Apparatus according to claim 1 wherein the portion of the flow conduit of reduced diameter is spaced from the inlet port of the fluid flow conduit.

\* \* \* \* \*